United States Patent
Chang et al.

(10) Patent No.: US 6,312,657 B1
(45) Date of Patent: Nov. 6, 2001

(54) PRODUCTION OF NITROUS OXIDE

(75) Inventors: Clarence D. Chang, Princeton, NJ (US); Scott A. Stevenson, Houston, TX (US); James C. Vartuli, West Chester, PA (US)

(73) Assignee: ExxonMobil Oil Corporation, Fairfax, VA (US)

( * ) Notice: Subject to any disclaimer, the term of this patent is extended or adjusted under 35 U.S.C. 154(b) by 0 days.

(21) Appl. No.: 09/139,227

(22) Filed: Aug. 25, 1998

(51) Int. Cl.$^7$ .................................................. C01B 21/26
(52) U.S. Cl. .............................................................. 423/404
(58) Field of Search ................................................ 423/404

(56) References Cited

U.S. PATENT DOCUMENTS

| | | | |
|---|---|---|---|
| 1,946,114 | * 2/1934 | Schlecht et al. | 423/404 |
| 3,926,853 | * 12/1975 | Senes et al. | 423/404 |
| 4,102,986 | 7/1978 | Smit et al. | 423/402 |
| 4,154,806 | 5/1979 | Szabo et al. | 423/400 |
| 4,720,377 | 1/1988 | Pennington | 423/400 |
| 5,102,643 | 4/1992 | Kresge et al. | 423/328 |
| 5,849,257 | * 12/1998 | Fujiwara et al. | 423/404 |

FOREIGN PATENT DOCUMENTS

| | | | |
|---|---|---|---|
| 1236819 | * 6/1971 | (GB) | 423/404 |
| 6122507 | 5/1994 | (JP) . | |

OTHER PUBLICATIONS

Chemical Abstracts 119:78897.*
Chemical Abstracts 106:126656.*
Chemical Abstracts 129:57968.*
Chemical Abstracts 104:229701.*
Chemical Abstracts 114: 30782.*
Chemical Abstracts 117: 259110.*
Chemical Abstracts 121:209752.*

* cited by examiner

*Primary Examiner*—Wayne Langel

(57) ABSTRACT

A process for producing nitrous oxide comprises reacting ammonia with nitric oxide and/or oxygen in the presence of a catalyst comprising a Group VIB metal oxide, to produce a reaction mixture comprising nitrous oxide, and optionally recovering the nitrous oxide from the effluent mixture.

5 Claims, No Drawings

PRODUCTION OF NITROUS OXIDE

FIELD OF THE INVENTION

This invention is directed to the production of nitrous oxide, $N_2O$, from ammonia and nitric oxide, NO, over a catalyst comprising a Group VIB metal oxide. Specifically, the catalyst of this invention comprises an oxide of a Group VIB metal such as molybdenum oxide, that may optionally be supported on a Group VIB metal oxide support such as zirconia, or on a solid support material such as silica, and that may optionally comprise a Group VIIIB metal oxide component such as iron oxide.

BACKGROUND OF THE INVENTION

One commercial process for making nitrous oxide involves the thermal decomposition of ammonium nitrate when heated from 200 to 260° C. according to the following equation:

$$NH_4NO_3 \rightarrow N_2O + 2H_2O$$

However, extreme caution must be used in handling ammonium nitrate, which may be highly explosive under extreme shock or elevated temperatures. Therefore, improved methods for controlling the thermal decomposition of ammonium nitrate have been disclosed. For example, the thermal decomposition of ammonium nitrate in the presence of a melt containing ammonium hydrogen sulfate and ammonium sulfate is described in U.S. Pat. No. 4,154,806; the thermal decomposition of ammonium nitrate into an aqueous, strongly acid reaction liquor containing chloride ions as a catalyst is described in U.S. Pat. No. 4,102,986; and the thermal decomposition of ammonium nitrate in a chloride-containing aqueous solution of nitric acid and the presence of catalytically active ions of manganese, copper, cerium, lead, bismuth, cobalt or nickel, is described in U.S. Pat. No. 3,656,899.

Another commercial process for producing nitrous oxide involves the reaction of ammonia and air using Mn and Bi oxides as catalysts. For example, Japanese Patent No. 6122507 describes a process for preparing nitrous oxide by the oxidation of ammonia with oxygen in the presence of steam and a $CuO/MnO_2$ catalyst. Other methods for producing nitrous oxide include the reaction of a molten nitrate salt with ammonium chloride and the reaction of ammonia with at least one molten nitrate salt of an alkaline earth metal, as described in U.S. Pat. No. 4,720,377.

The present invention is directed to the conversion of ammonia with nitric oxide and/or oxygen into nitrous oxide using a catalyst comprising a Group VIB metal oxide. Accordingly, the present invention avoids the dangers associated with the use and handling of ammonium nitrate and is an alternative and novel nitrous oxide synthesis method that is inexpensive and safe.

SUMMARY OF THE INVENTION

The present invention is directed to a process for producing nitrous oxide comprising the step of reacting ammonia with nitric oxide and/or oxygen in the presence of a catalyst comprising a Group VIB metal oxide, to produce an effluent mixture comprising nitrous oxide.

DETAILED DESCRIPTION OF THE INVENTION

The Catalyst

One embodiment of the present invention utilizes the Group VIB metal oxide alone as the catalyst for reaction.

A second embodiment utilizes a catalyst that comprises the Group VIB metal oxide in combination with the Group VIIIB metal oxide.

A third embodiment utilizes a catalyst that comprises the Group VIB metal oxide, in combination with the Group IVB metal oxide as a support.

A fourth embodiment utilizes a catalyst that comprises the Group VIB and Group VIIIB metal oxides, in combination with the Group IVB metal oxide as a support.

A fifth embodiment utilizes a catalyst that comprises the Group VIB metal oxide, in combination with a solid support material.

A sixth embodiment utilizes a catalyst that comprises the Group VIB and Group VIIIB metal oxides, in combination with the solid support material.

The Group VIB metal oxide of the present invention may be an oxide of chromium, molybdenum or tungsten. Preferably, the Group VIB metal oxide is molybdenum oxide, $MoO_3$. Sources of the Group VIB metal oxide may include pure molybdenum oxide $MoO_3$, ammonium heptamolybdate tetrahydrate $(NH_4)_6Mo_7O_{24} \cdot 4H_2O$, and molybdenum halides and oxyhalides.

The Group IVB metal oxide of the present invention may be an oxide of titanium, zirconium or hafnium. Preferably, the Group IVB metal oxide is zirconia. Sources of the Group IVB metal oxide may include zirconyl chloride and zirconyl nitrate. When the Group IVB metal oxide is used in combination with the Group VIB metal oxide, the weight ratio of the Group VIB metal oxide to Group IVB metal oxide is from about 0.001:1 to 0.5:1, and preferably from about 0.1:1 to 0.3:1.

Examples of the solid support materials include silica and the material designated M41S, which is described in U.S. Pat. No. 5,102,643. A particular example of such an M41S material is a material designated MCM-41, which is described in U.S. Pat. No. 5,098,684. When the Group VIB metal oxide is used in combination with the solid support material, the weight ratio of the Group VIB metal oxide to the solid support material is from about 0.05:1 to 0.8:1, and preferably from about 0.15:1 to 0.6:1.

The Group VIIIB metal oxide may be an oxide of iron. Preferably, the Group VIIIB metal oxide is iron oxide. Sources of the Group VIIIB metal oxide may include iron (II) sulfate heptahydrate $FeSO_4 \cdot 7H_2O$, iron halides and iron nitrate. When the Group VIIIB metal oxide is used in combination with the Group VIB metal oxide alone, the Group VIB and Group IVB metal oxides, or the Group VIB metal oxide and the solid support material, the molar ratio of the Group VIIIB metal oxide to the Group VIB metal oxide is from about 0.001:1 to 0.1:1, and preferably from about 0.005:1 to 0.05:1.

Preparation of the Catalyst

The catalyst of the present invention may be prepared, for example, by combining a first liquid solution comprising a source of the Group VIB metal oxide, and a second liquid solution comprising a source of the Group IVB metal and/or a third liquid solution comprising a source of the Group VIIIB metal oxide, under conditions sufficient to cause precipitation of the catalyst Examples of the precipitating reagent include ammonium hydroxide, alkylammonium hydroxide and alkaline hydroxides such as sodium hydroxide. Water is a preferred solvent for these solutions.

Optionally, the liquid solution from which the catalyst is precipitated may comprise a solid support material, in which case the components of the catalyst may be precipitated directly onto the solid support material. For example, the Group VIIIB metal oxide may optionally be co-precipitated from the liquid solution, along with the Group VIB metal oxide, directly onto the solid support material.

The temperature at which the liquid solution is maintained during precipitation may be less than about 200° C., e.g., from about 0° to 200° C. A particular range of such temperatures is from about 50° to 100° C. The pH range of the liquid solution during precipitation is from about 4 to 11.

The catalyst may be recovered from the liquid solution by filtration, followed by drying. The catalyst may be subjected to a final calcination as described below to dehydrate the catalyst and to confer the required mechanical strength on the catalyst.

Calcination of the catalyst may be carried out, preferably in an oxidizing atmosphere, at about atmospheric pressure to 6890 kPa (about 1000 psi); and at temperatures from about 500° to 850° C. The calcination time may be up to 48 hours, e.g., for about 0.5 to 24 hours, e.g., for about 1.0 to 10 hours.

The Process

Nitric oxide and ammonia are converted to nitrous oxide in the present invention by a reaction which may be described by the following equation:

$$4NH_3 + 4NO + 3O_2 \rightarrow 4N_2O + 6H_2O,$$

although other reactions may also occur.

An additional reaction that occurs when oxygen is present is the oxidation of ammonia with oxygen to form nitrous oxide which may be described by the following equation:

$$2NH_3 + 2O_2 \rightarrow N_2O + 3H_2O$$

The molar feed ratio of nitric oxide to ammonia ranges from about 0.01:1 to 10:1; the amount of oxygen fed to the reaction unit ranges from about 0.01 to 35 molar %.

The method according to the present invention is carried out at a temperature ranging from about 200 to 600° C., and preferably from about 300 to 500° C.; a pressure ranging from about 0.1 to 100 atmospheres, and preferably from about 0.5 to 5 atmospheres. The gas hourly space velocity for the reaction ranges from about 1,000 to 10,000,000 hr$^{-1}$, and preferably from about 20,000 to 1,000,000 hr$^{-1}$.

The effluent mixture comprises nitrogen, oxygen, nitric oxide, ammonia and the desired product, nitrous oxide. The nitrous oxide may be separated and recovered from the effluent mixture by conventional means known to skilled artisans or the entire effluent may be used as a feed to a separate reactor. Alternatively, the nitrous oxide can be utilized in situ as a selective oxidant for various substrates. For example, benzene could be co-fed with the reactants and phenol product recovered.

The invention will now be more particularly described with reference to the Examples, each of which discloses the conversion of a gaseous mixture containing ammonia together with nitric oxide and/or oxygen, with the balance in each case being helium.

EXAMPLE I

Five hundred grams of ZrOCl$_2$.8H$_2$O were dissolved with stirring in 6.0 liters of distilled water. To this, a solution containing 33 grams of (NH$_4$)$_6$Mo$_7$O$_{24}$.4H$_2$O in 500 ml of H$_2$O was added. Finally, a solution containing 263 ml of conc. NH$_4$OH and 500 ml of distilled H$_2$O was added dropwise over a 30–45 minute period. The pH of the solution was approximately 9. This slurry was then placed in a steambox for 72 hours. The product formed was recovered by filtration, washed with excess water, and dried overnight at 85° C. The material was then calcined in air at 700° C. for 3 hours. Chemical analysis of the dried materials showed an Mo/Zr ratio of 0.11 (weight basis); this corresponds to a water-free sample composition of approximately 7.3% Mo.

Table 1 shows the activity and selectivity of this sample for the conversion of 500 ppm each of ammonia and nitric oxide into N$_2$O at a space velocity of approximately 600,000 hr$^{-1}$. At 500° C., about 60% of the inlet ammonia and nitric oxide is converted. The selectivity to N$_2$O is approximately 61%; the remaining 39% of the material is converted to N$_2$.

TABLE 1

Conversion of NO and NH$_3$ to N$_2$O over catalyst described in Example I.
0.050 g catalyst used. Space velocity~600,000 hr$^{-1}$.

| | inlet concentrations | | | outlet concentrations | | | | selectivity to |
|---|---|---|---|---|---|---|---|---|
| T(° C.) | O$_2$(%) | NH$_3$(ppm) | NO(ppm) | NH$_3$(ppm) | NO(ppm) | N$_2$(ppm) | N$_2$O(ppm) | N$_2$O |
| 300 | 1 | 500 | 500 | 448 | 447 | 45 | 5 | 9.9% |
| 350 | 1 | 500 | 500 | 399 | 397 | 84 | 14 | 14.4% |
| 400 | 1 | 500 | 500 | 345 | 345 | 105 | 44 | 29.6% |
| 450 | 1 | 500 | 500 | 273 | 288 | 109 | 107 | 49.7% |
| 500 | 1 | 500 | 500 | 173 | 230 | 115 | 180 | 61.1% |

EXAMPLE II

This catalyst was prepared in a manner identical to Example I except that it was calcined in air at 830° C. for 3 hours. Table 2 shows that calcination of this material at a higher temperature gives higher selectivity to N$_2$O at temperatures of 400° C. and below than the catalyst of Example I, but a lower selectivity at 500° C. The selectivity of this sample is much less affected by temperature than that of the catalyst used in Example I.

TABLE 2

Conversion of NO and $NH_3$ to $N_2O$ over catalyst described in Example II.
0.050 g catalyst used. Space velocity~600,000 $hr^{-1}$.

| T(° C.) | inlet concentrations | | | outlet concentrations | | | | selectivity to |
|---|---|---|---|---|---|---|---|---|
| | $O_2$(%) | $NH_3$(ppm) | NO(ppm) | $NH_3$(ppm) | NO(ppm) | $N_2$(ppm) | $N_2O$(ppm) | $N_2O$ |
| 300 | 1 | 500 | 500 | 465 | 473 | 14 | 16 | 52.7% |
| 350 | 1 | 500 | 500 | 397 | 432 | 37 | 47 | 55.7% |
| 400 | 1 | 500 | 500 | 291 | 397 | 70 | 85 | 54.8% |
| 450 | 1 | 500 | 500 | 193 | 378 | 101 | 110 | 52.2% |
| 500 | 1 | 500 | 500 | 132 | 378 | 124 | 117 | 48.5% |

EXAMPLE III

Five hundred grams of $ZrOCl_2.8H_2O$ were dissolved with stirring in 6.0 liters of distilled water. To this, a solution containing 66 grams of $(NH_4)_6Mo_7O_{24}.4H_2O$ in 500 ml of $H_2O$ was added. Finally, a solution containing 263 ml of conc. $NH_4OH$ and 500 ml of distilled $H_2O$ was added dropwise over a 30–45 minute period. The pH of the solution was adjusted to approximately 9 by the addition of 146 grams of concentrated $NH_4OH$. This slurry was then placed in a steambox for 72 hours. The product formed was recovered by filtration, washed with excess water, and dried overnight at 85° C. The material was then calcined in air at 600° C. for 3 hours. Chemical analysis of the dried materials showed an Mo/Zr ratio of 0.19 (weight basis); this corresponds to a water-free sample composition of approximately 11.4% Mo. Table 3 shows the activity and selectivity of this sample for $N_2O$ formation. The higher concentrations of molybdenum gives both higher activities and selectivities than observed in Example I.

TABLE 3

Conversion of NO and $NH_3$ to $N_2O$ over catalyst described in Example III.
0.050 g catalyst used. Space velocity~600,000 $hr^{-1}$.

| T(° C.) | inlet concentrations | | | outlet concentrations | | | | selectivity to |
|---|---|---|---|---|---|---|---|---|
| | $O_2$(%) | $NH_3$(ppm) | NO(ppm) | $NH_3$(ppm) | NO(ppm) | $N_2$(ppm) | $N_2O$(ppm) | $N_2O$ |
| 300 | 1 | 500 | 500 | 385 | 385 | 91 | 15 | 14.5% |
| 350 | 1 | 500 | 500 | 322 | 321 | 121 | 50 | 29.0% |
| 400 | 1 | 500 | 500 | 252 | 269 | 109 | 125 | 53.5% |
| 450 | 1 | 500 | 500 | 167 | 228 | 95 | 205 | 68.4% |
| 500 | 1 | 500 | 500 | 92 | 211 | 99 | 250 | 71.7% |

EXAMPLE IV

Five hundred grams of $ZrOCl_2.8H_2O$ were dissolved with stirring in 6.0 liters of distilled water. To this, a solution containing 66 grams of $(NH_4)_6Mo_7O_{24}.4H_2O$ in 500 ml of $H_2O$ was added. Another solution containing 7.5 grams of $FeSO_4.7H_2O$ in 500 ml of $H_2O$ was added. Finally, a solution containing 263 ml of conc. $NH_4OH$ and 500 ml of distilled $H_2O$ was added dropwise over a 30–45 minute period. The pH of the solution was adjusted to approximately 9. This slurry was then placed in a steambox for 72 hours. The product formed was recovered by filtration, washed with excess water, and dried overnight at 85° C. The material was then calcined in air at 600° C. for 3 hours. Chemical analysis of the dried materials showed an Mo/Zr ratio of 0.20 (weight basis) and an Fe/Zr ratio of 0.012; this corresponds to a water-free sample composition of approximately 12.1% Mo and 0.72% Fe. Table 4 shows the activity and selectivity of this iron-containing sample.

TABLE 4

Conversion of NO and $NH_3$ to $N_2O$ over catalyst described in Example IV.
0.052 g catalyst used. Space velocity~600,000 hr$^{-1}$.

| | inlet concentrations | | | outlet concentrations | | | | selectivity to |
|---|---|---|---|---|---|---|---|---|
| T(° C.) | $O_2$(%) | $NH_3$(ppm) | NO(ppm) | $NH_3$(ppm) | NO(ppm) | $N_2$(ppm) | $N_2O$(ppm) | $N_2O$ |
| 300 | 1 | 500 | 500 | 387 | 382 | 90 | 19 | 17.2% |
| 350 | 1 | 500 | 500 | 310 | 314 | 117 | 62 | 34.4% |
| 400 | 1 | 500 | 500 | 220 | 259 | 110 | 145 | 56.9% |
| 450 | 1 | 500 | 500 | 132 | 226 | 101 | 216 | 68.1% |
| 500 | 1 | 500 | 500 | 70 | 222 | 106 | 246 | 69.8% |

EXAMPLE V 250 grams of $ZrOCl_2.8H_2O$ were dissolved with stirring in 1.5 liters of distilled water. This solution was heated to approximately 60° C. To this, a solution containing 33 grams of $(NH_4)_6Mo_7O_{24}.4H_2O$ and 130 grams of conc. $NH_4OH$ in 1250 ml of $H_2O$ was added. This solution was also heated to approximately 60° C. The solution containing the zirconyl chloride was slowly added to the second solution with mixing. The pH of the solution was approximately 7. This slurry was then placed in a steambox for 72 hours. The product formed was recovered by filtration, washed with excess water, and dried overnight at 85° C. The material was then calcined in air at 600° C. for 3 hours. Chemical analysis of the dried materials showed an Mo/Zr ratio of 0.24 (weight basis); this corresponds to a water-free sample composition of approximately 14.1% Mo. Table 5 shows that catalyst synthesis at a higher temperature results in a sample with slightly higher selectivity to $N_2O$, especially at temperatures of 400° C. and below, as compared to Example III.

TABLE 5

Conversion of NO and $NH_3$ to $N_2O$ over catalyst described in Example V.
0.064 g catalyst used. Space velocity~450,000 hr$^{-1}$.

| | inlet concentrations | | | outlet concentrations | | | | selectivity to |
|---|---|---|---|---|---|---|---|---|
| T(° C.) | $O_2$(%) | $NH_3$(ppm) | NO(ppm) | $NH_3$(ppm) | NO(ppm) | $N_2$(ppm) | $N_2O$(ppm) | $N_2O$ |
| 300 | 1 | 500 | 500 | 371 | 362 | 90 | 30 | 25.3% |
| 350 | 1 | 500 | 500 | 272 | 279 | 117 | 93 | 44.2% |
| 400 | 1 | 500 | 500 | 162 | 223 | 112 | 185 | 62.2% |
| 450 | 1 | 500 | 500 | 78 | 202 | 106 | 246 | 69.9% |
| 500 | 1 | 500 | 500 | 32 | 208 | 108 | 265 | 71.1% |

EXAMPLE VI

This catalyst was prepared in a manner identical to Example V except that it was calcined in air at 700° C. for 3 hours. Table 6 shows that calcining at 700° C. lowers overall activity somewhat compared to Example V; selectivities to $N_2O$ are higher at 400° C. and below but are lower at 450 and 500° C.

TABLE 6

Conversion of NO and $NH_3$ to $N_2O$ over catalyst described in Example VI.
0.054 g catalyst used. Space velocity~600,000 hr$^{-1}$.

| | inlet concentrations | | | outlet concentrations | | | | selectivity to |
|---|---|---|---|---|---|---|---|---|
| T(° C.) | $O_2$(%) | $NH_3$(ppm) | NO(ppm) | $NH_3$(ppm) | NO(ppm) | $N_2$(ppm) | $N_2O$(ppm) | $N_2O$ |
| 300 | 1 | 500 | 500 | 402 | 403 | 62 | 30 | 32.8% |
| 350 | 1 | 500 | 500 | 306 | 330 | 89 | 85 | 49.0% |
| 400 | 1 | 500 | 500 | 197 | 280 | 98 | 157 | 61.7% |
| 450 | 1 | 500 | 500 | 111 | 260 | 106 | 204 | 65.9% |
| 500 | 1 | 500 | 500 | 57 | 261 | 115 | 220 | 65.8% |

EXAMPLE VII

This catalyst was prepared in a manner identical to Example V except that it was calcined in air at 830° C. for 3 hours. Table 7 shows that calcining at 830° C. lowers both activity and selectivity to $N_2O$.

TABLE 7

Conversion of NO and NH₃ to N₂O over catalyst described in Example VII.
0.052 g catalyst used. Space velocity ~600,000 hr⁻¹.

| | inlet concentrations | | | outlet concentrations | | | | selectivity to |
|---|---|---|---|---|---|---|---|---|
| T(° C.) | $O_2$(%) | $NH_3$(ppm) | NO(ppm) | $NH_3$(ppm) | NO(ppm) | $N_2$(ppm) | $N_2O$(ppm) | $N_2O$ |
| 300 | 1 | 500 | 500 | 449 | 453 | 29 | 21 | 41.7% |
| 350 | 1 | 500 | 500 | 376 | 401 | 54 | 57 | 51.1% |
| 400 | 1 | 500 | 500 | 276 | 361 | 77 | 102 | 57.0% |
| 450 | 1 | 500 | 500 | 183 | 336 | 97 | 140 | 59.2% |
| 500 | 1 | 500 | 500 | 115 | 327 | 112 | 161 | 59.0% |

EXAMPLE VIII

A solution containing 41.4 grams of $(NH_4)_6Mo_7O_{24} \cdot 4H_2O$ and 200 grams of $H_2O$ was prepared. The solution was slowly added to 150 grams of silica (HiSil 233) and placed in a polypropylene bottle. This mixture was mixed using a roller overnight. The product formed was recovered by filtration, washed with minimum water, and dried overnight at 85° C. The material was then calcined in air at 540° C. for 3 hours. From the preparation we expect this sample to contain approximately 15% Mo by weight. Table 8 shows that this Mo/SiO₂ catalyst can also convert nitric oxide and ammonia into N₂O, although in this case with a lower selectivity than most of the examples described above.

TABLE 8

Conversion of NO and NH₃ to N₂O over catalyst described in Example VIII.
0.147 g catalyst used. Space velocity ~200,000 hr⁻¹.

| | inlet concentrations | | | outlet concentrations | | | | selectivity to |
|---|---|---|---|---|---|---|---|---|
| T(° C.) | $O_2$(%) | $NH_3$(ppm) | NO(ppm) | $NH_3$(ppm) | NO(ppm) | $N_2$(ppm) | $N_2O$(ppm) | $N_2O$ |
| 300 | 1 | 500 | 500 | 471 | 472 | 21 | 10 | 31.1% |
| 350 | 1 | 500 | 500 | 442 | 442 | 40 | 18 | 31.3% |
| 400 | 1 | 500 | 500 | 392 | 401 | 66 | 32 | 32.8% |
| 450 | 1 | 500 | 500 | 323 | 351 | 100 | 54 | 35.2% |
| 500 | 1 | 500 | 500 | 205 | 280 | 150 | 92 | 38.1% |

EXAMPLE IX

Table 9 shows that bulk MoO₃, obtained from the Aldrich Chemical Company, is also an effective catalyst for converting nitric oxide and ammonia into N₂O. Compared to the supported catalysts, selectivities at 350° C. and below are higher, but fall steadily as temperature increases.

TABLE 9

Conversion of NO and NH₃ to N₂O over catalyst described in Example IX.
0.266 g catalyst used. Space velocity ~120,000 hr⁻¹.

| | inlet concentrations | | | outlet concentrations | | | | selectivity to |
|---|---|---|---|---|---|---|---|---|
| T(° C.) | $O_2$(%) | $NH_3$(ppm) | NO(ppm) | $NH_3$(ppm) | NO(ppm) | $N_2$(ppm) | $N_2O$(ppm) | $N_2O$ |
| 300 | 1 | 500 | 500 | 462 | 466 | 10 | 33 | 76.0% |
| 350 | 1 | 500 | 500 | 386 | 415 | 29 | 73 | 71.4% |
| 400 | 1 | 500 | 500 | 243 | 353 | 72 | 128 | 63.9% |
| 450 | 1 | 500 | 500 | 32 | 340 | 151 | 148 | 49.5% |
| 500 | 1 | 500 | 500 | 0 | 449 | 194 | 61 | 23.8% |

EXAMPLE X

The data shown in Table 10 were collected using the catalyst described in Example III. They show that selectivity to N₂O is not a strong function of inlet nitric oxide and ammonia concentration when nitric oxide and ammonia are fed in equimolar amounts. There is no reason to believe that feeding much higher concentrations of nitric oxide and ammonia would not also result in the formation of correspondingly high concentrations of N₂O.

TABLE 10

Conversion of NO and NH₃ to N₂O over catalyst described in Example III.
Effect of variations in inlet NO and NH₃ concentrations.
0.050 g catalyst used. Space velocity ~600,000 hr$^{-1}$.

| | inlet concentrations | | | outlet concentrations | | | selectivity to |
|---|---|---|---|---|---|---|---|
| T(° C.) | O$_2$(%) | NH$_3$(ppm) | NO(ppm) | NH$_3$(ppm) | NO(ppm) | N$_2$(ppm) | N$_2$O(ppm) | N$_2$O |
| 500 | 1 | 500 | 500 | 242 | 311 | 63 | 157 | 71.4% |
| 500 | 1 | 200 | 200 | 84 | 132 | 25 | 68 | 73.4% |
| 500 | 1 | 350 | 350 | 163 | 220 | 45 | 114 | 71.7% |
| 500 | 1 | 750 | 750 | 387 | 463 | 95 | 230 | 70.9% |
| 500 | 1 | 907 | 907 | 481 | 560 | 115 | 277 | 71.6% |

EXAMPLE XI

The data shown in Table 11 were collected using the catalyst described in Example V. They show that significant amounts of N$_2$O are formed even if nitric oxide and ammonia are not fed in equimolar amounts.

TABLE 11

Conversion of NO and NH₃ to N₂O over catalyst described in Example V.
Effect of variations in inlet NO and NH₃ concentrations.
0.064 catalyst used. Space velocity ~450,000 hr$^{-1}$.

| | inlet concentrations | | | outlet concentrations | | | selectivity to |
|---|---|---|---|---|---|---|---|
| T(° C.) | O$_2$(%) | NH$_3$(ppm) | NO(ppm) | NH$_3$(ppm) | NO(ppm) | N$_2$(ppm) | N$_2$O(ppm) | N$_2$O |
| 500 | 1 | 500 | 500 | 32 | 208 | 108 | 265 | 71.1% |
| 500 | 1 | 625 | 375 | 54 | 108 | 148 | 260 | 63.7% |

EXAMPLE XII

The data shown in Table 12 were collected using the catalyst described in Example IV. They show that some N$_2$O is formed even when no nitric oxide is fed, i.e., when only ammonia and oxygen are fed. Selectivities are lower, however, than when equimolar amounts of nitric oxide and ammonia are fed.

TABLE 12

Conversion of NO and NH₃ to N₂O over catalyst described in Example IV.
Effect of feeding only NH₃.
0.050 g catalyst used. Space velocity ~600,000 hr$^{-1}$.

| | inlet concentrations | | | outlet concentrations | | | selectivity to |
|---|---|---|---|---|---|---|---|
| T(° C.) | O$_2$(%) | NH$_3$(ppm) | NO(ppm) | NH$_3$(ppm) | NO(ppm) | N$_2$(ppm) | N$_2$O(ppm) | N$_2$O |
| 445 | 1 | 500 | 0 | 211 | 0 | 119 | 17 | 12.5% |
| 445 | 2 | 500 | 0 | 212 | 0 | 124 | 20 | 13.9% |
| 445 | 3 | 500 | 0 | 214 | 0 | 127 | 22 | 14.5% |
| 550 | 1 | 500 | 0 | 48 | 16 | 149 | 61 | 29.0% |
| 550 | 3 | 500 | 0 | 51 | 19 | 143 | 78 | 35.3% |
| 550 | 0.6 | 500 | 0 | 54 | 14 | 146 | 58 | 28.5% |
| 550 | 0.6 | 1000 | 0 | 145 | 12 | 316 | 90 | 22.2% |
| 550 | 0.6 | 1840 | 0 | 337 | 9 | 606 | 125 | 17.1% |

EXAMPLE XIII

The data shown in Table 13 were collected using the catalyst described in Example 3 calcined at 600° C. They show that the conversion and N$_2$O selectivity are increased as increasing amounts of oxygen in the 1–4.5% range are fed

TABLE 13

Effect of oxygen concentration on conversion of NO and $NH_3$ over $Mo/ZrO_2$
calcined at 600 C.
GHSV: 1,375,000 $hr^{-1}$
Feed: $NH_3$(500 ppm); NO(500 ppm); $O_2$(1–4.5%)

| T(° C.) | inlet $O_2$(ppm) | outlet concentrations | | | | percent conversion* | selectivity to $N_2O$† |
|---|---|---|---|---|---|---|---|
| | | $NH_3$(ppm) | NO(ppm) | $N_2$(ppm) | $N_2O$(ppm) | | |
| 450 | 1 | 319 | 347 | 52 | 111 | 32.5 | 68.3 |
| 450 | 4.5 | 319 | 342 | 53 | 116 | 33.8 | 68.6 |
| 475 | 1 | 278 | 326 | 58 | 137 | 38.9 | 70.4 |
| 475 | 4.5 | 276 | 320 | 57 | 145 | 40.4 | 71.8 |
| 500 | 1 | 247 | 310 | 62 | 159 | 44.2 | 72.0 |
| 500 | 2 | 240 | 306 | 61 | 167 | 45.6 | 73.5 |

*defined as $(N_2 + N_2O)$(inlet $NH_3$ + inlet NO)
†defined as $(N_2O)(N_2 + N_2O)$

What is claimed is:

1. A process for producing nitrous oxide comprising the step of reacting ammonia with nitric oxide and/or oxygen in the presence of a catalyst comprising a Group VIB metal oxide on a support comprising zirconia, to produce an effluent mixture comprising nitrous oxide, wherein the catalyst is produced by precipitation of said Group VIB metal oxide from solution onto said support to form a catalyst precursor and then calcining the catalyst precursor at a temperature of about 500° C. to about 850° C.

2. The process of claim 1 and including the further step of recovering the nitrous oxide from the effluent mixture.

3. The process of claim 1 wherein the Group VIB metal oxide of the catalyst is molybdenum oxide.

4. The process of claim 1 wherein said step of reacting ammonia with nitric oxide and/or oxygen in the presence of a catalyst is carried out at a temperature of 400° to 500° C.

5. The process of claim 1 wherein said catalyst further comprises iron oxide.

* * * * *